US012574985B2

(12) United States Patent
Song et al.

(10) Patent No.: US 12,574,985 B2
(45) Date of Patent: Mar. 10, 2026

(54) METHODS AND APPARATUSES FOR POLICY CONTROL

(71) Applicant: Telefonaktiebolaget LM Ericsson (publ), Stockholm (SE)

(72) Inventors: Yumei Song, Gothenburg (SE); Hong Zhang, Gothenburg (SE); Susana Fernandez Alonso, Madrid (ES); Yingjiao He, Shanghai (CN); Juan Xu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 502 days.

(21) Appl. No.: 18/018,544

(22) PCT Filed: Jun. 18, 2021

(86) PCT No.: PCT/EP2021/066654
§ 371 (c)(1),
(2) Date: Jan. 27, 2023

(87) PCT Pub. No.: WO2022/022889
PCT Pub. Date: Feb. 3, 2022

(65) Prior Publication Data
US 2023/0292398 A1 Sep. 14, 2023

(30) Foreign Application Priority Data
Jul. 31, 2020 (WO) ............... PCT/CN2020/106156

(51) Int. Cl.
| | |
|---|---|
| *H04W 76/18* | (2018.01) |
| *H04L 12/14* | (2024.01) |
| *H04M 15/00* | (2024.01) |
| *H04W 8/18* | (2009.01) |
| *H04W 76/30* | (2018.01) |

(52) U.S. Cl.
CPC ......... *H04W 76/18* (2018.02); *H04L 12/1407* (2013.01); *H04W 8/18* (2013.01); *H04W 76/30* (2018.02); *H04M 15/66* (2013.01)

(58) Field of Classification Search
CPC ....... H04L 12/14–1407; H04L 12/1876; H04L 67/143; H04W 8/18–205; H04W 76/18;
(Continued)

(56) References Cited

U.S. PATENT DOCUMENTS

| | | | |
|---|---|---|---|
| 11,974,350 B2 * | 4/2024 | Dao .................... | H04L 41/0895 |
| 2020/0037148 A1 * | 1/2020 | Wang ................ | H04M 15/8033 |

(Continued)

FOREIGN PATENT DOCUMENTS

| | | | |
|---|---|---|---|
| WO | 2009/056046 A1 | 5/2009 | |
| WO | 2018/174846 A1 | 9/2018 | |
| WO | WO-2021245063 A1 * | 12/2021 | ......... H04L 41/0894 |

OTHER PUBLICATIONS

European Telecommunications Standards Institute. 5G; 5G System; Session Management Policy Control Service; Stage 3 (3GPP TS 29.512 version 15.2.0 Release 15). ETSI TS 129 512 V15.2.0, ETSI, Apr. 2019, www.etsi.org/deliver/etsi_ts/129500_129599/129512/15.02.00_60/ts_129512v150200p.pdf.*

(Continued)

*Primary Examiner* — Brendan Y Higa
(74) *Attorney, Agent, or Firm* — Rothwell, Figg, Ernst & Manbeck, P.C.

(57) ABSTRACT

Methods and apparatuses for policy control are disclosed. According to an embodiment, a first network function receives a message from a second network function indicating to create or update one or more session rules and/or one or more Policy and Charging Control, PCC, rules. The first network function determines whether terminate a packet data unit, PDU, session based on a failure result of validation
(Continued)

and/or enforcement of the session rules and/or PCC rules; and the first network function, when determining to terminate the PDU session based on the failure result, sends to the second network function a policy control delete message which comprises information indicating that the PDU session is terminated due to rule failure, including session rule failure and/or PCC rule failure.

17 Claims, 8 Drawing Sheets

(58) Field of Classification Search
CPC ........................ H04W 76/30–36; H04W 80/10; H04M 15/66
See application file for complete search history.

(56) References Cited

U.S. PATENT DOCUMENTS

2020/0092424 A1* 3/2020 Qiao ................... H04L 12/1407
2023/0403173 A1* 12/2023 Zhang ............... H04M 15/8228

OTHER PUBLICATIONS

International Search Report and Written Opinion dated Sep. 20, 2021 in International Application No. PCT/EP2021/066654 (12 pages).

Huawei, "Session Rule error handling," 3GPP TSG-CT WG3 Meeting #103, May 13-17, 2019, C3-192179 (revision C3-191395), XP051745306 (32 pages).

Ericsson, "Correction to SM Policy Association termination due to session rule error", 3GPP TSG-CT WG3 Meeting #112e, E-Meeting, Nov. 4-13, 2020, C3-205125 (revision of C3-205xyz) (42 pages).

Ericsson, "Correction to SM Policy Association termination due to session rule error", 3GPP TSG-CT WG3 Meeting #112e, E-Meeting, Nov. 4-13, 2020, C3-205436 (revision of C3-205125) (42 pages).

3GPP TS 29.512 V16.5.0, 3rd Generation Partnership Project; Technical Specification Group Core Network and Terminals; 5G System; Session Management Policy Control Service; Stage 3 (Release 16), Jun. 2020 (197 pages).

* cited by examiner

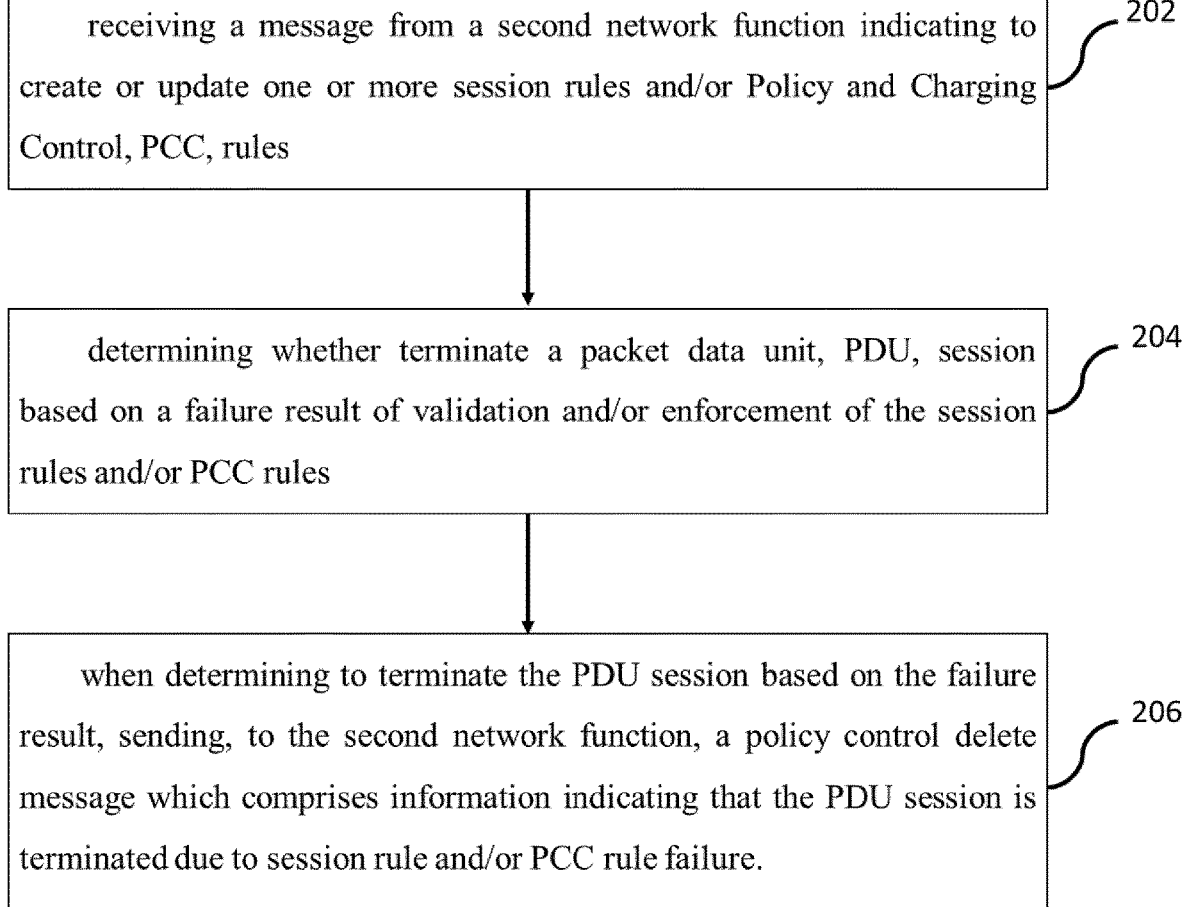

receiving a message from a second network function indicating to create or update one or more session rules and/or Policy and Charging Control, PCC, rules          202 determining whether terminate a packet data unit, PDU, session based on a failure result of validation and/or enforcement of the session rules and/or PCC rules          204 when determining to terminate the PDU session based on the failure result, sending, to the second network function, a policy control delete message which comprises information indicating that the PDU session is terminated due to session rule and/or PCC rule failure.          206

Fig. 2 sending a message to a first network function indicating to create or update one or more session rules and/or Policy and Charging Control, PCC, rules — 302 receiving, from the first network function, a policy control delete message which comprises information indicating that the PDU session is terminated due to PCC rule and/or session rule failure, when the first network function determine to terminate a PDU session based on a failure result of validation and/or enforcement of the session rules and/or PCC rules — 304

Fig. 3

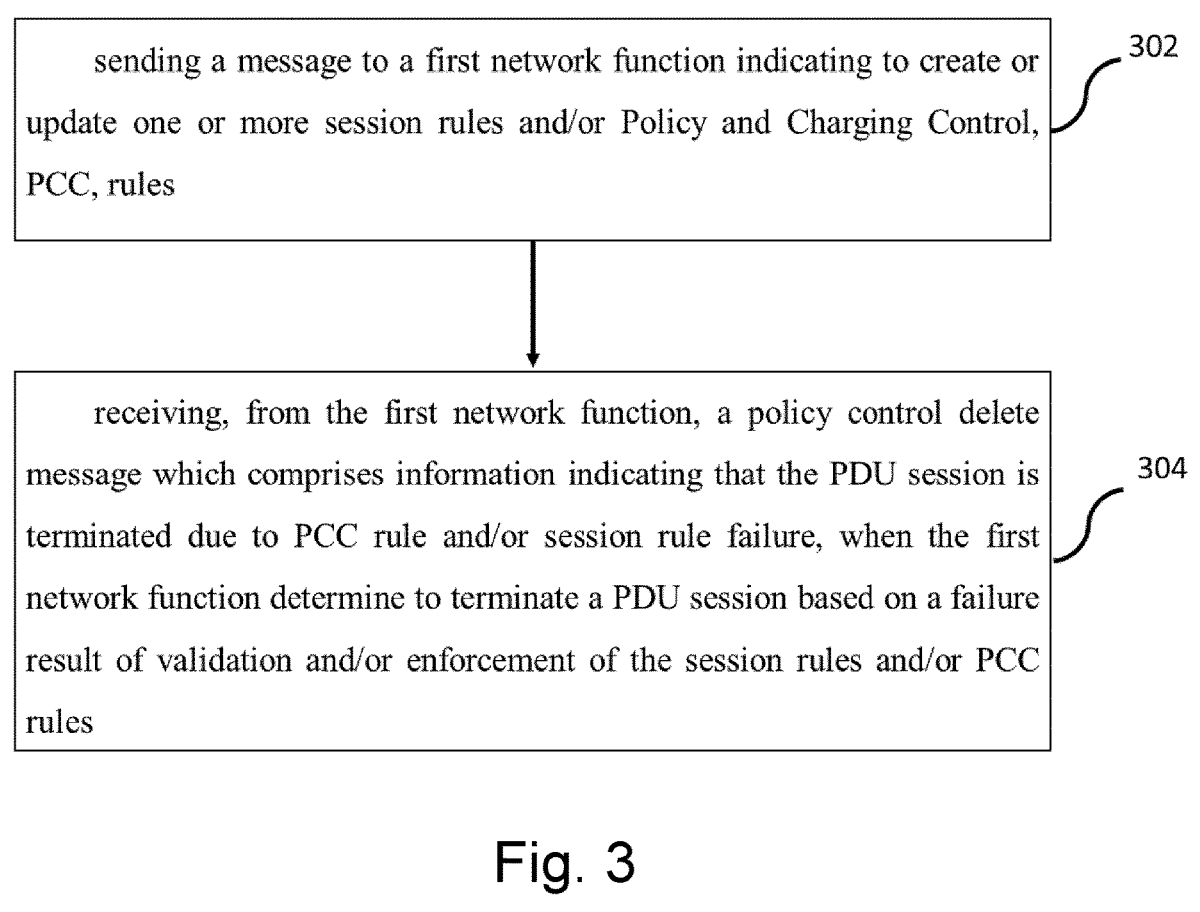

First network node
900

Sending module
902

Receiving module
904

Fig. 9

METHODS AND APPARATUSES FOR POLICY CONTROL

CROSS REFERENCE TO RELATED APPLICATIONS

This application is a 35 U.S.C. § 371 National Stage of International Patent Application No. PCT/EP2021/066654, filed Jun. 18, 2021, which also claims priority to Chinese Patent Application No. PCT/CN2020/106156, filed on Jul. 31, 2020. The above-identified applications are incorporated by this reference.

TECHNICAL FIELD

Embodiments of the disclosure generally relate to communication, and, more particularly, to methods and apparatuses for policy control.

BACKGROUND

This section introduces aspects that may facilitate better understanding of the present disclosure. Accordingly, the statements of this section are to be read in this light and are not to be understood as admissions about what is in the prior art or what is not in the prior art.

The 3rd generation partnership project, 3GPP, Technical Specification, TS, 29.513 V16.3.0 (2020-03) describes the policy framework architecture in 5th Generation, 5G, communication system. In the policy framework architecture, the Policy and Charging Function, PCF, supports unified policy framework to govern network behavior; the PCF provides policy rules to Control Plane function(s) to enforce them and accesses subscription information relevant for policy decisions in a Unified Data Repository, UDR.

The 3GPP TS 29.512 V16.5.0 (2020-06) specified the Session Management Policy Control Service. It performs provisioning, update and removal of session related policies and Policy and Charging Control, PCC, rules by the PCF to the Network Function, NF, service consumer (i.e. Session Management Function, SMF). The Session Management Policy Control Service can be used for charging control, policy control, application detection and control and/or access traffic steering, switching and splitting within a Multi-Access (MA) Protocol Data Unit, PDU, Session.

The 3GPP also specified policy framework architecture for the 4th Generation, 4G, communication system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, the PCF performs the provision, update or remove session related rules (session rules) and PCC rules to SMF, the SMF or User Plane Function, UPF and other related network functions, performs the enforcement of the session related policies and/or PCC rules.

In the current 3GPP specifications, during the session management related policy control procedure, if the SMF receives one or more PCC rules, but the validation of partial or all the PCC Rule was unsuccessful, the SMF shall report the PCC rule error of affected PCC rules to the PCF; or if the SMF receives one or more session rules, but the validation of partial or all the session rules was unsuccessful, the SMF shall report the session rule error of the affected session rules to the PCF. On the other hand, the SMF shall apply the corresponding procedures towards the access network, the User Equipment, UE, and the UPF for the enforcement of the session rules or PCC rules. When the enforcement error occurs, the SMF shall report the session rule error of the affected session rules or PCC rule error of the affected PCC rules. In some secenarios, the PDU session may need to be terminated due to the validation and/or enforcement error based on the policy of operator, in such cases, the SMF may first report session rule or PCC rule error to PCF, afterwards a plocy control delete message may be sent to PCF. There are two times singalling interaction between SMF and PCF, especially, in some cases, i.e. due to the NF (e.g, UPF, Access and Mobile Management Function, AMF, Radio Access Network, RAN, UE) failure, the enforcement of the rules may fail and the SMF needs to delete all PDU sessions related with the failed NF, which may result in a plurality of signalling interactions between the SMF and the PCF.

The disclosure is to provide an improved solution for the related policy control procedure, this disclosure proposes to introduce an option for the SMF to skip the rule error, including session rule error and/or PCC rule error, report to the PCF when the PDU session termination due to or having PCC rule and/or session rule failure, and the SMF reports the rule failure to PCF in Session Management Policy Association termination procedure. This may reduce signaling between the SMF and the PCF and makes PCF aware of the termination reason for rule failure.

The problems and solution described above are also applicable for a Packet Data Network Gateway—Control plane, PGW-C and or a Policy and Charging Rules Function, PCRF, in 4G communication system, or the PGW-C and the PCF when the PGW-C interacts with PCF via N7 interface.

According to a first aspect of the disclosure, there is provided a method performed by a first network function. The method comprises receiving a message from a second network function indicating to create or update one or more session rules and/or Policy and Charging Control, PCC, rules. The method further comprises determining whether terminate a packet data unit, PDU, session based on a failure result of validation and/or enforcement of the session rules and/or the PCC rules. The method another further comprises, when determine to terminate the PDU session based on the failure result, sending to the second network function, a policy control delete message which comprises information indicating that the PDU session is terminated due to session rule and/or PCC rule failure. In an embodiment of the disclosure, the message from the second network function may comprise one of a policy control update notify request message; a policy control update response message in respond to a policy control update request message from the first network function to the second network function; or a policy control create response message in respond to a policy control create request message from the first network function to the second network function.

In an embodiment of the disclosure, the failure result of the enforcement of the session rules and/or PCC rules which results in terminating the PDU session may comprise determining to delete all PDU sessions related to a third network function due to failure of the third network function which is associated with the first network function; The failure result may futher compries determining to terminate the PDU session based on local configuration when the session rules and/or PCC rules can not be enforced by the first network function. The failure result may another futher compries determining to terminate the PDU session based on local configuration when receiving, from the third network function, failure response or timeout indicating the session rules and/or PCC rules can not be enforced by the third network function. In an embodiment of the disclosure, the failure result of the enforcement of the session rules and/or PCC rules which results in terminating the PDU session may comprise determining to terminate the PDU session based on combination of more than one itmes above.

In an embodiment of the disclosure, the failure result of validation of the session rules and/or PCC rules which results in terminating the PDU session may comprise determining to terminate the PDU session based on the validation indicating the session rule error occurring. The failure result of validation may comprise all the PCC rules error occurring and no locally configured PCC rule available. The failure result of validation may comprise determining to terminate the PDU session based on a local configuration when the validation indicates one or more mandatory information elements, IEs, are incorrect.

In an embodiment of the disclosure, the policy control delete message may comprise a PduSessionRelCause IE with a value indicating the session rule and/or PCC rule failure.

In an embodiment of the disclosure, the first network function may comprise a Session Management Function, SMF, or a Packet Data Network Gateway—Control plane, PGW-C.

In an embodiment of the disclosure, the second network function may comprises a Policy Control Function (PCF), or a Policy and Charging Rules Function (PCRF).

In an embodiment of the disclosure, the third network function may comprise one of a User Plane Function, UPF, an Access and Mobility management Function, AMF, a Mobility Management Entity, MME, a Radio Access Netwrok, RAN, or a User Equipment, UE.

According to a second aspect of the disclosure, there is provided a method performed by a second network function. The method comprises sending a message to a first network function indicating to create or update one or more session rules and/or one or more Policy and Charging Control, PCC, rules. The method further comprises receiving, from the first network function, a policy control delete message which comprises information indicating that the PDU session is terminated due to PCC rule and/or session rule failure, when the first network function determine to terminate a PDU session based on a failure result of validation and/or enforcement of the session rules and/or PCC rules.

In an embodiment of the disclosure, the message to the first network function may comprise one of a policy control update notify request message; a policy control update response message in respond to a policy control update request message from the first network function; or a policy control create response message in respond to a policy control create request message from the first network function.

In an embodiment of the disclosure, the policy control delete message may comprise a PduSessionRelCause information element, IE, with a value indicating rule failure in.

In an embodiment of the disclosure, the first network function may comprise a Session Management Function, SMF, or a Packet Data Network Gateway—Control plane, PGW-C.

In an embodiment of the disclosure, the second network function may comprise a Policy Control Function, PCF, or a Policy and Charging Rules Function, PCRF.

According to a third aspect of the disclosure, there is provided a first network node. The first network node comprises at least one processor and at least one memory. The at least one memory contains instructions executable by the at least one processor, whereby the first network node is operative to receive a message from a second network function indicating to create or update one or more session rules and/or one or more Policy and Charging Control, PCC, rules. The first node is further operative to determine whether terminate a packet data unit, PDU, session based on a failure result of validation and/or enforcement of the session rules and/or PCC rules. The first node is further operative to, when determining to terminate the PDU session based on the failure result, sending to the second network function a policy control delete message which comprises information indicating that the PDU session is terminated due to or having rule failure, including session rule failure and/or PCC rule failure.

In an embodiment of the disclosure, the first network node may be operative to perform the method according to the above first aspect.

According to a fourth aspect of the disclosure, there is provided a second network node. The second network node comprises at least one processor and at least one memory. The at least one memory contains instructions executable by the at least one processor, whereby the second network node is operative to send a message to a first network function indicating to create or update one or more session rules and/or one or more Policy and Charging Control, PCC, rules. The second node is further operative to receive, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

In an embodiment of the disclosure, the second network node may be operative to perform the method according to the above second aspect.

According to a fifth aspect of the disclosure, there is provided a computer program product. The computer program product may comprise instructions which when executed by at least one processor, cause the at least one processor to perform the method according to any of the above first to second aspects.

According to a sixth aspect of the disclosure, there is provided a computer readable storage medium. The computer readable storage medium may comprise instructions which when executed by at least one processor, cause the at least one processor to perform the method according to any of the above first to second aspects.

According to a seventh aspect of the disclosure, there is provided a first network node. The first network node may comprise a receiving module for receiving a message from a second network function indicating to create or update one or more session rules and/or one or more Policy and Charging Control, PCC, rules. The first network node may further comprise a determining module for determining whether terminate a packet data unit, PDU, session based on a failure result of validation and/or enforcement of the session rules and/or PCC rules. The first network node may further comprise a sending module for, when determining to terminate the PDU session based on the failure result, sending to the second network function a policy control delete message which comprises information indicating that the PDU session is terminated due to or having rule failure, including session rule failure and/or PCC rule failure.

According to an eighth aspect of the disclosure, there is provided a second network node. The second network node may comprise a sending module for sending a message to a first network function indicating to create or update one or more session rules and/or one or more Policy and Charging Control, PCC, rules. The second network node may further comprise a receiving module for receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

According to a ninth aspect of the disclosure, there is provided a method implemented in a communication system. The method comprises, at a first network function, receiving a message from a second network function indicating to create or update one or more session rules and/or one or more Policy and Charging Control, PCC, rules. The method further comprises determining whether terminate a packet data unit, PDU, session based on a failure result of validation and/or enforcement of the session rules and/or PCC rules. The method further comprises, when determining to terminate the PDU session based on the failure result, sending, to the second network function, a policy control delete message which comprises information indicating that the PDU session is terminated due to or having rule failure, including session rule failure and/or PCC rule failure. The method further comprises, at the second network function, sending a message to a first network function indicating to create or update one or more session rules and/or one or more Policy and Charging Control, PCC, rules. The method further comprises receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

According to a tenth aspect of the disclosure, there is provided a communication system. The communication system may comprise a first network node and a second network node. The first network node may be configured to: receiving a message from a second network function indicating to create or update one or more session rules and/or one or more Policy and Charging Control, PCC, rules; determining whether terminate a packet data unit, PDU, session based on a failure result of validation and/or enforcement of the session rules and/or PCC rules; and when determining to terminate the PDU session based on the failure result, sending, to the second network function, a policy control delete message which comprises information indicating that the PDU session is terminated due to or having rule failure, including session rule failure and/or PCC rule failure. The second network node may be configured to sending a message to a first network function indicating to create or update one or more session rules and/or one or more Policy and Charging Control, PCC, rules; receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 2 is a flowchart illustrating a method performed by a first network function according to an embodiment of the disclosure;

FIG. 3 is a flowchart illustrating a method performed by a second network function according to an embodiment of the disclosure;

FIG. 9 is a block diagram showing a second network node according to an embodiment of the disclosure.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As describes above, when the SMF/PGW-C determines to delete a PDU session due to or having the session rule error and/or PCC rule error, it may send a policy update message to the PCF/PCRF to report the session rule error or the PCC rule error, then send another policy control delete message to PCF/PCRF to delete the Policy association session, which leads two times singalling interaction between SMF/PGW-C and PCF/PCRF. The present disclosure proposes an improved solution for polcy control to resolve the technical problem and it may reduce signaling interaction between the SMF/PGW-C and the PCF/PCRF. Hereinafter, the solution will be described in detail with reference to FIGS. 1-9.

Figure 1:
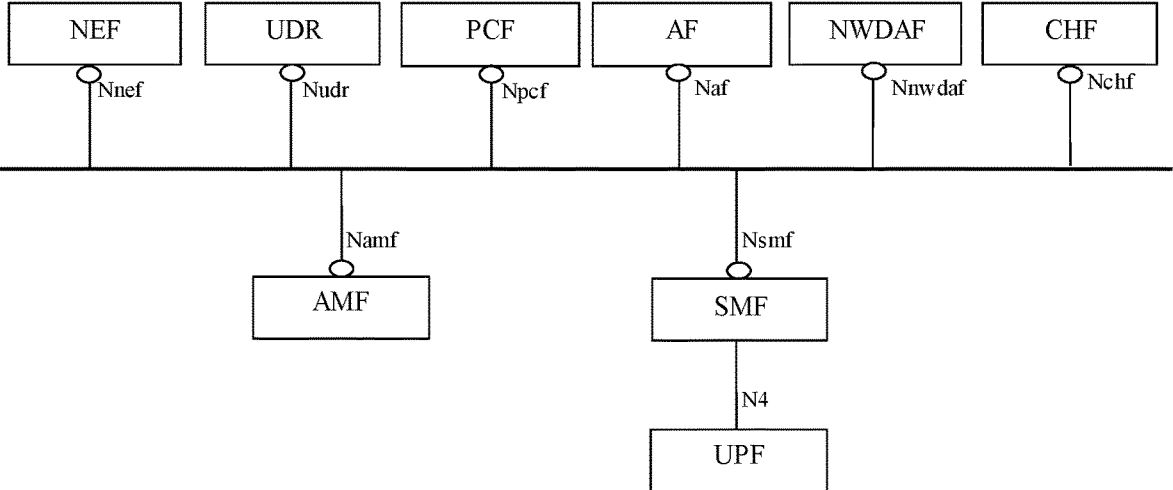
FIG. 1 is a diagram illustrating an exemplary policy framework architecture into which the disclosure is applicable.

FIG. 1 is a diagram showing a policy framework architecture into which an embodiment of the disclosure is applicable. As FIG. 1 shown, the policy framework architecture comprises the functions of the Policy Control Function, PCF, the policy and charging enforcement functionality supported by the Session and Mobility Management Function, SMF, and User Plane Function, UPF, the access and mobility policy enforcement functionality supported by the Access Management Function, AMF, the Network Data Analytics Function, NWDAF, the Network Exposure Function, NEF, the Charging Function, CHF, the Unified Data Repository, UDR, and the Application Function, AF. The detailed description of the above entities is specified in clause 4 of 29.513 V16.3.0 (2020-03), which is incorporated herein by reference in its entirety.

Note that within the context of this disclosure, the term terminal device (or UE) used herein may also be referred to as, for example, access terminal, mobile station, mobile unit, subscriber station, or the like. It may refer to any (stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

FIG. 2 is a flowchart illustrating a method performed by a first network function according to an embodiment of the disclosure. The first network function may be an SMF, PGW-C or any other entity having similar functionality. Note that the network function mentioned in this document may be implemented either as a network element on a dedicated hardware, as a software instance running on a dedicated hardware, or as a virtualized function instantiated on an appropriate platform, e.g. on a cloud infrastructure. At block 202, the first network function receives a message from a second network function indicating to create or update one or more session rules and/or one or more Policy and Charging Control, PCC, rules. The second network function may be a PCF, PCRF or any other entity having similar functionality. As an exemplary example, the message may be a policy control update notify request message. As another example, the policy message may be a policy control update response message, which is in respond to a policy control update request message from the first network function to the second network function. As a further another example, the message may be a policy control create response message which is in respond to a policy control create request message from the first network function to the second network function.

When receives the message, the first network function, at block 204, determines whether terminate a packet data unit, PDU, session based on a failure result of validation and/or enforcement of the session rules and/or PCC rules. As an example, the failure result of the enforcement of the session rules and/or PCC rules which results in terminating the PDU session may be determining to delete all PDU sessions related to a third network function due to failure of the third network function which is associated with the first network function. As another example, the failure result of the enforcement of the session rules and/or PCC rules may be determining to terminate the PDU session based on local configuration when the session rules and/or PCC rules cannot be enforced by the first network function. As another further example, the failure result of the enforcement of the session rules and/or PCC rules may be determining to terminate the PDU session based on local configuration when receiving, from the third network function, failure response or timeout indicating the session rules and/or PCC rules cannot be enforced by the third network function. In the above examples, the third network function may be one of User Plane Function, UPF; Access and Mobility management Function, AMF; Mobility Management Entity, MME; Radio Access Network, RAN; or User Equipment, UE.

In an example, the failure result of validation of the session rules and/or PCC rules which results in terminating the PDU session may be determining to terminate the PDU session based on the validation indicating the session rule failure occurring. As an another example, the failure result of validation of the session rules and/or PCC rules which results in terminating the PDU session may be determining to terminate the PDU session based on the validation indicating all the PCC rules failure occurring and no locally configured PCC rule available at policy control create. As a further another example, the failure result of validation of the session rules and/or PCC rules which results in terminating the PDU session may be determining to terminate the PDU session based on a local configuration when the validation indicates one or more mandatory information elements, IEs, are incorrect.

When the first network function determines to terminate the PDU session based on the failure result, the first network function, at the block 206, sends, to the second network function, a policy control delete message which comprises information indicating that the PDU session is terminated due to or having rule failure, including session rule failure and/or PCC rule failure. As an example, the information indicating that the PDU session is terminated due to or having PCC rule failure and/or session rule failure comprises a PduSessionRelCause IE in the policy control delete message with a value indicating rule failure.

FIG. 3 is a flowchart illustrating a method performed by a second network function according to an embodiment of the disclosure. The second network function may be a PCF, PCRF or any other entity having similar functionality. At block 302, the second network function sends a message to a first network function indicating to create or update one or more session rules and/or one or more Policy and Charging Control, PCC, rules. The first network function may be a SMF, PGW-C or any other entity having similar functionality. As an example, the message may be a policy control update notify request message. As another example, the message may be a policy control update response message which is in respond to a policy control update request message from the first network function to the second network function. As a further another example, the message may be a policy control create response message which is in respond to a policy control create request message from the first network function.

At block 304, the second network function receives from the first network function a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules. The block 304 corresponds to block 206, as an example, as described above, the information indicating that the PDU session is terminated due to or having PCC rule failure and/or session rule failure may be a PduSessionRelCause information element, IE, with a value indicating rule failure in the policy control delete message.

Figure 4:
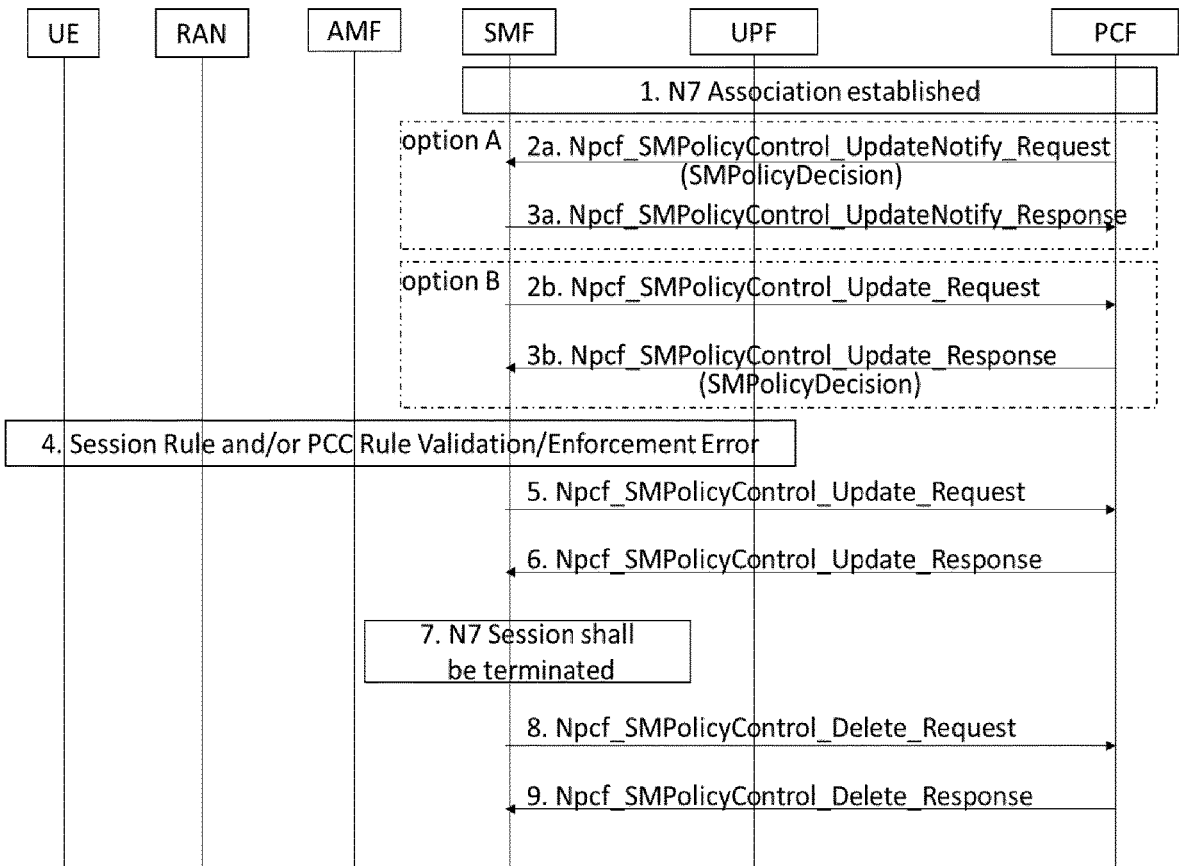
FIG. 4 is a flowchart illustrating a process according to existing technology.

FIG. 4 is a flowchart illustrating the process according to the exemplary example of the existing technology. As shown, this process involves six entities: a UE, a RAN, an AMF, a SMF, a UPF, and a PCF. At step 1, the N7 association between the SMF and the PCF has established.

As shown in the FIG. 4, the option A comprises step 2*a* and 3*a* and the option B comprises step 2*b* and 3*b*. In the option A, the PCF sends a Npcf_SMPolicyControl_UpdateNotify_Request message including the SMPolicyDecision information to the SMF at the step 2*a*; the SMPolicyDecision information indicates the SMF to update the one or more session rules and/or PCC rules. At step 3*a*, the SMF sends Npcf_SMPolicyControl_UpdateNotify_Response to the PCF in respond to the received message at the step 2*a*.

On the other hand, in the option B, the SMF sends a Npcf_SMPolicyControl_Update_Request message to the PCF at the step 2*b*; in respond to the received message at the step 2*b*, the PCF sends Npcf_SMPolicyControl_Update_Response including SMPolicyDecision information to the SMF at step 3*b*. The SMPolicyDecision information indicates the SMF to update the one or more session rules and/or PCC rules.

At the step 4, the SMF performs the validation for the received session rules and/or PCC rules; and the SMF, UPF, AMF, RAN, UE performs the enforcement of the rules. When the validation and/or enforcement error occurs, the SMF reports the session rules error and/or PCC rules error to PCF at the step 5 using the Npcf_SMPolicyControl_Update_Request message, and at step 6, the PCF sends the Npcf_SMPolicyControl_Update_Response message to the SMF indicating the result.

At the step 7, based on the session rules error and/or PCC rules error, the SMF determines whether the N7 Session shall be terminated. If the N7 session is determined to be terminated, at the step 8, the SMF sends the Npcf_SMPolicyControl_Delete_Request to the PCF indicating to terminate the N7 session; and then, at the step 9, the PCF sends the Npcf_SMPolicyControl_Delete_Response the SMF indicating the result.

According to the above description, for the scenarios that the N7 session shall be terminated, there are two signaling interactions between the SMF and the PCF, that are the step 5,6 and step 8,9.

Figure 5:
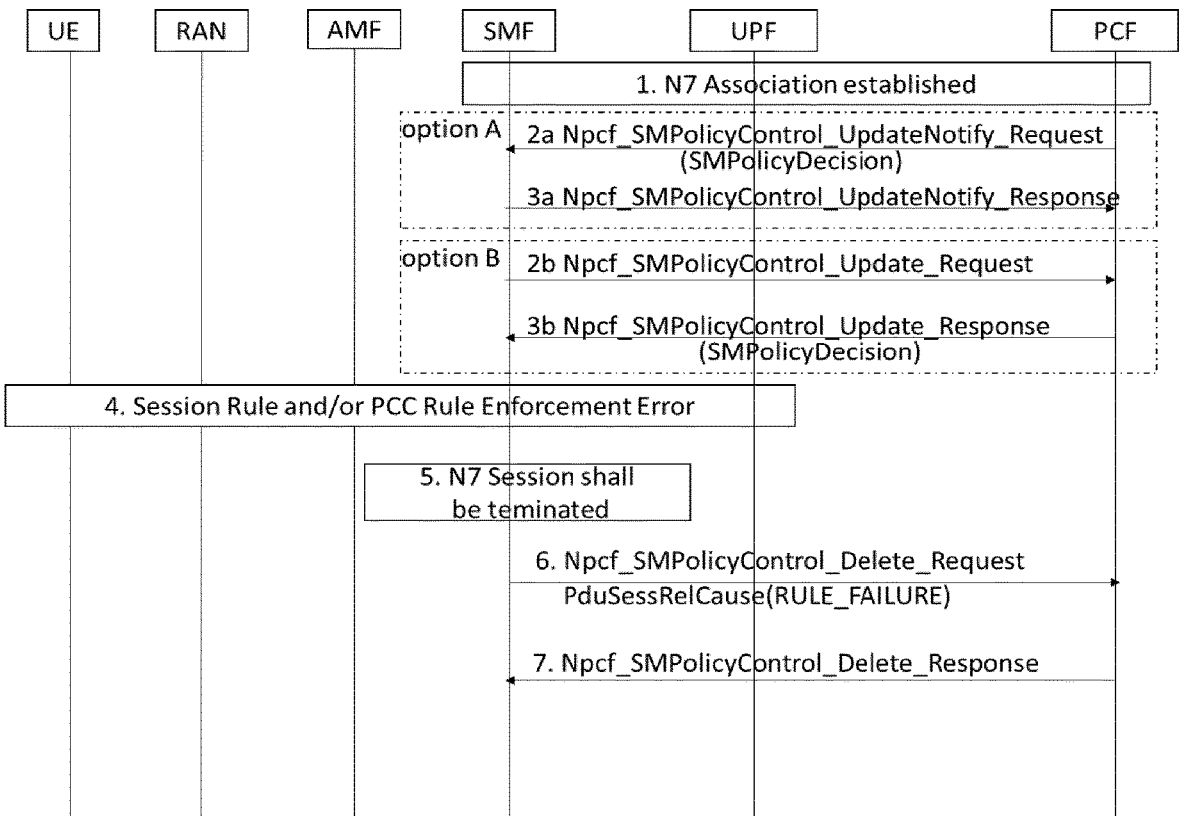
FIG. 5 is a flowchart illustrating an exemplary process according to an embodiment of the disclosure.

FIG. 5 is a flowchart illustrating an exemplary process according to an embodiment of the disclosure. As shown, this process also involves six entities: a UE, a RAN, an AMF, a SMF, a UPF, and a PCF. At step 1, the N7 association between the SMF and the PCF has established. The steps 2 to 4 are same as the description of the step 2 to 4 in the FIG. 4.

At the step 5, the SMF determines whether the N7 Session shall be terminated based on the validation/enforcement for the session rules error and/or PCC rules error. The SMF may determine to terminate the PDU session based on the validation indicating the session rule failure occurring. The SMF may determine to terminate the PDU session based on a local configuration when the validation indicates one or more mandatory information elements, IEs, are incorrect.

The SMF may determine to terminate the PDU session based on the enforcement result performed by itself for the session rules and or PCC rules. The SMF may determine to delete all PDU sessions related to a third network function due to failure of the third network function which is associated with the first network function. The SMF may determine to terminate the PDU session based on local configuration when receiving failure response, including timeout, from the third network function. The third network function may comprise a UPF, an AMF, a RAN, or a UE.

If the N7 session is determined to be terminated, at the step 6, the SMF sends the Npcf_SMPolicyControl_Delete_Request to the PCF indicating to terminate the N7 session, and the message comprises information indicating that the PDU session is terminated due to or having rule failure. The rule failure includes session rule failure and/or PCC rule failure. The information may be a PduSessionRelCause information element, IE, with the value RULE FAILURE in the Npcf_SMPolicyControl_Delete_Request. And then, at the step 7, the PCF sends the Npcf_SMPolicyControl_Delete_Response to the SMF indicating the result.

As the description above, the steps 5, 6 in the FIG. 4 are skipped. The corresponding information related that the PDU session is terminated due to or having PCC rule and/or session rule failure are included in the Npcf_SMPolicyControl_Delete_Request in the step 6 in FIG. 5. In this way, it may reduce the signaling interaction between the SMF and the PCF.

Figure 6:
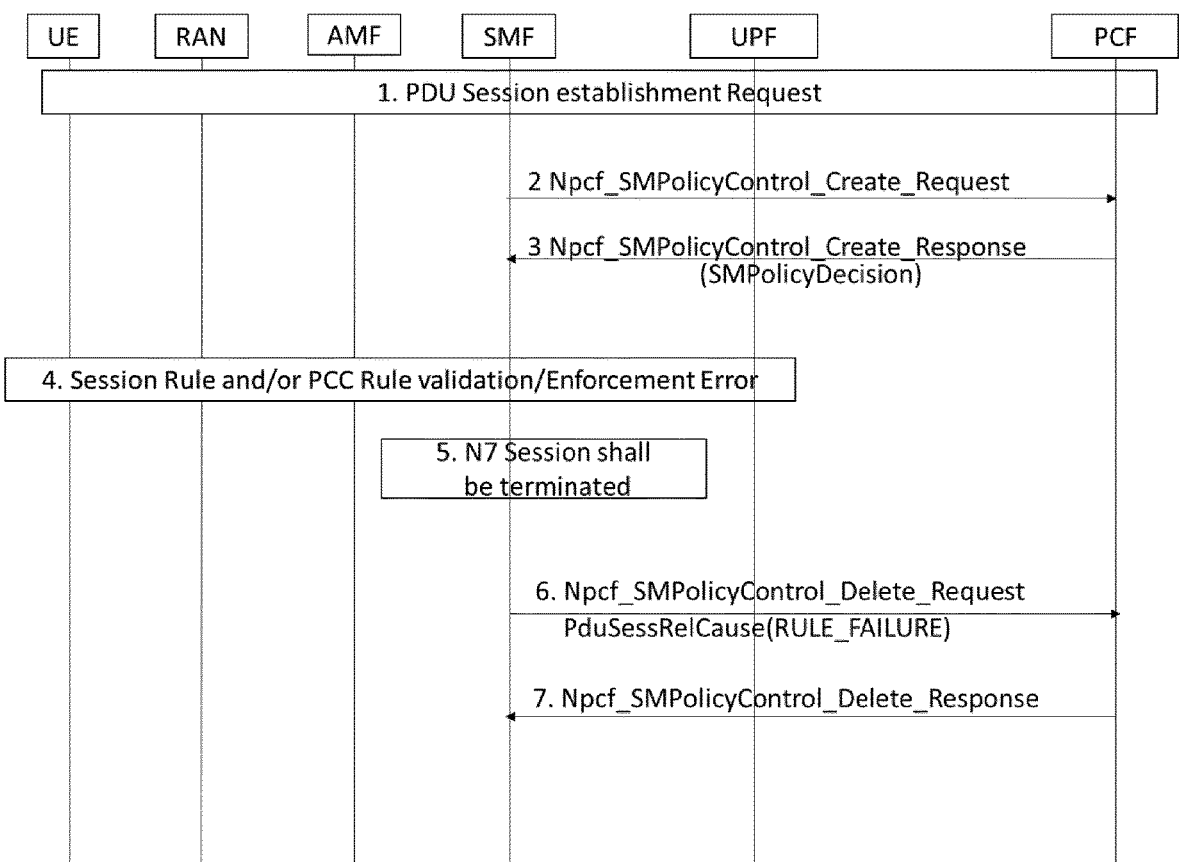
FIG. 6 is a flowchart illustrating an exemplary process according to another embodiment of the disclosure.

FIG. 6 is another flowchart illustrating a process according to an embodiment of the disclosure. As shown, this process also involves six entities: a UE, a RAN, an AMF, a SMF, a UPF, and a PCF. At step 1, the N7 association between the SMF and the PCF has established. At the step 2, the SMF sends a Npcf_SMPolicyControl_Create_Request to request create the policy control. In respond to the request message, at the step 3, the PCF sends Npcf_SMPolicyControl_Create_Response to the SMF including the SMPolicyDecision information. The SMPolicyDecision information indicates the SMF to create the one or more session rules or PCC rules. The steps 4-7 are same as the description of the steps 4-7 in the FIG. 5. As the description above, the information related that the PDU session is terminated due to or having PCC rule and/or session rule failure are included in the Npcf_SMPolicyControl_Delete_Request in the step 6. In this way, it may reduce the signaling interaction between the SMF and the PCF.

Based on the above description, at least one aspect of the disclosure provides a method implemented in a communication system. The method may comprise, at the second network function, sending a message to a first network function indicating to create or update one or more session rules and/or one or more Policy and Charging Control, PCC, rules. The method may further comprise, at a first network function, receiving a message from a second network function indicating to create or update one or more session rules and/or one or more Policy and Charging Control, PCC, rules. The method may further comprise, at the first network function, determining whether terminate a packet data unit, PDU, session based on a failure result of validation and/or enforcement of the session rules and/or PCC rules. The method may further comprise, at the first network function, when determining to terminate the PDU session based on the failure result, sending, to the second network function, a policy control delete message which comprises information indicating that the PDU session is terminated due to or having rule failure, including session rule failure and/or PCC rule failure. The method may further comprise, at the second network function, receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

Figure 7:
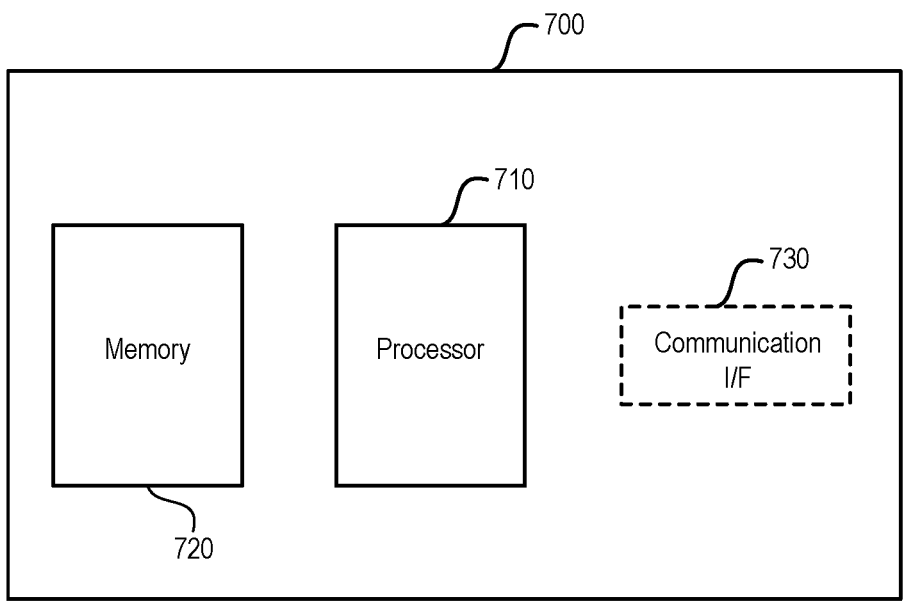
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the SMF described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor-based memory devices, flash memories, magnetic memory devices and systems, optical memory devices and systems, fixed memories and removable memories. The processor 710 may be of any type suitable to the local technical environment, and may include one or more of general-purpose computers, special purpose computers, micropro-cessors, digital signal processors (DSPs) and processors based on multi-core processor architectures, as non-limiting examples.

Figure 8:
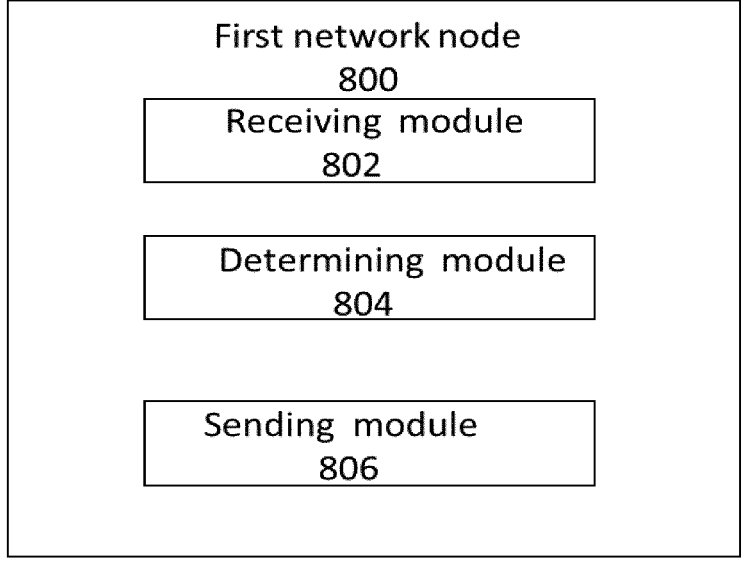
FIG. 8 is a block diagram showing a first network node according to an embodiment of the disclosure.

FIG. 8 is a block diagram showing a first network node according to an embodiment of the disclosure. As shown, the first network node 800 comprises a receiving module 802, a determining module 804 and a sending module 806. The receiving module 802 may be configured to receive a message from a second network function indicating to create or update one or more session rules and/or one or more Policy and Charging Control, PCC, rules, as described above with respect to block 202. The determining module 804 may be configured to determine whether terminate a packet data unit, PDU, session based on a failure result of validation and/or enforcement of the session rules and/or PCC rules, as described above with respect to block 204. The sending module 206 may be configured to, when determining to terminate the PDU session based on the failure result, send to the second network function, a policy control delete message which comprises information indicating that the PDU session is terminated due to or having rule failure, including session rule failure and/or PCC rule failure, as described above with respect to block 206.

Figure 9:
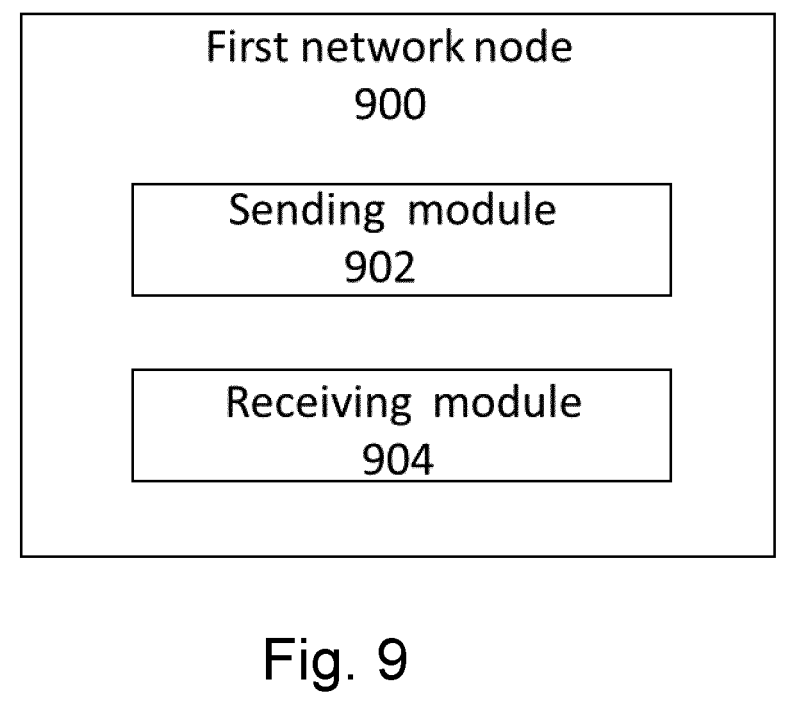

FIG. 9 is a block diagram showing a second network node according to an embodiment of the disclosure. As shown, the second network node 900 comprises a sending module 902 and a receiving module 904. The sending module 902 may be configured to send a message to a first network function indicating to create or update one or more session rules and/or one or more Policy and Charging Control, PCC, rules, as described above with respect to block 302. The receiving module 904 may be configured to receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules, as described above with respect to block 304.

Based on the above description, at least one aspect of the disclosure provides a communication system. The communication system may comprise a first network node and a second network node. The first network node may be configured to: receiving a message from a second network function indicating to create or update one or more session rules and/or one or more Policy and Charging Control, PCC, rules; determining whether terminate a packet data unit, PDU, session based on a failure result of validation and/or enforcement of the session rules and/or PCC rules; and when determining to terminate the PDU session based on the failure result, sending, to the second network function, a policy control delete message which comprises information indicating that the PDU session is terminated due to or having rule failure, including session rule failure and/or PCC rule failure. The second network node may be configured to sending a message to a first network function indicating to create or update one or more session rules and/or one or more Policy and Charging Control, PCC, rules; receiving, from the first network function, a policy control delete message which comprises information indicating that the PDU session is terminated due to or having rule failure, including PCC rule failure and/or session rule failure, when the first network function determine to terminate a PDU session based on a failure result of validation and/or enforcement of the session rules and/or PCC rules.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband cir-cuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

14

What is claimed is:

1. A method performed by a first network function, comprising:
   receiving a message from a second network function a set of one or more rules, wherein the set of one or more rules comprises one or more session rules and/or one or more policy and charging control (PCC) rules;
   determining whether to terminate a packet data unit (PDU) session based on a failure of an enforcement of the session rules and/or the PCC rules; and
   when determining to terminate the PDU session based on the failure, sending, to the second network function, a policy control delete message which comprises information indicating that the PDU session is terminated due to a session rule and/or a PCC rule failure.

2. The method of claim 1, wherein the message from the second network function further comprises:
   a policy control update notify request message;
   a policy control update response message that is responsive to a policy control update request message from the first network function to the second network function; or
   a policy control create response message that is responsive to a policy control create request message from the first network function to the second network function.

3. The method of claim 1, wherein the failure which results in terminating the PDU session comprises:
   determining to delete all PDU sessions related to a third network function due to a failure of the third network function which is associated with the first network function;
   determining to terminate the PDU session based on a local configuration when the session rules and/or the PCC rules cannot be enforced by the first network function; and/or
   determining to terminate the PDU session based on a local configuration when receiving, from the third network function, a failure response or a timeout indicating the session rules and/or the PCC rules cannot be enforced by the third network function.

4. The method of claim 1, wherein the failure which results in terminating the PDU session comprises:
   determining to terminate the PDU session based on the validation indicating the session rule failure occurring;
   determining to terminate the PDU session based on the validation indicating all the PCC rules failure occurring and no locally configured PCC rule available at policy control create; and/or
   determining to terminate the PDU session based on a local configuration when the validation indicates one or more mandatory information elements (IEs) are incorrect.

5. The method of claim 1, wherein the policy control delete message comprises a PduSessionRelCause IE with a value indicating the session rule and/or the PCC rule failure.

6. The method of claim 1, wherein the first network function comprises a Session Management Function or a Packet Data Network Gateway-Control plane.

7. The method of claim 1, wherein the second network function comprises a Policy Control Function or a Policy and Charging Rules Function.

8. The method of claim 3, wherein the third network function comprises:
   a User Plane Function;
   an Access and Mobility management Function;
   a Mobility Management Entity;
   a Radio Access Network; or
   a User Equipment.

9. A method performed by a second network function, comprising:

sending to a first network function a message comprising a set of one or more rules, the set of one or more rules comprising one or more session rules and/or one or more policy and charging control (PCC) rules; and when a PDU session is determined to be terminated by the first network function based on a failure of an enforcement of the session rules and/or the PCC rules, receiving, from the first network function, a policy control delete message which comprises information indicating the PDU session is terminated due to the session rule and/or the PCC rule failure.

10. The method of claim 9, wherein the message to the first network function further comprises:

a policy control update notify request message;

a policy control update response message that is responsive to a policy control update request message from the first network function; or a policy control create response message that is responsive to a policy control create request message from the first network function.

11. The method of claim 9, wherein the policy control delete message comprises a PduSessionRelCause information element (IE) with a value indicating that the PDU session is terminated due to the PCC rule and/or the session rule failure.

12. The method of claim 9, wherein the first network function comprises a Session Management Function or a Packet Data Network Gateway-Control plane.

13. The method of claim 9, wherein the second network function comprises a Policy Control Function or a Policy and Charging Rules Function.

14. A first network node implementing a first network function, comprising:

at least one processor; and at least one memory, the at least one memory containing instructions executable by the at least one processor, wherein the first network node is configured to perform a process comprising:

receiving a message from a second network function comprising a set of one or more rules, wherein the set of one or more rules comprises one or more session rules and/or one or more policy and charging control (PCC) rules;

determining whether to terminate a packet data unit (PDU) session based on a failure of an enforcement of the session rules and/or the PCC rules; and when determining to terminate the PDU session based on the failure, sending, to the second network function, a policy control delete message which comprises information indicating that the PDU session is terminated due to a session rule and/or a PCC rule failure.

15. The first network node of claim 14, wherein the message from the second network function further comprises:

a policy control update notify request message;

a policy control update response message that is responsive to a policy control update request message; or a policy control create response message that is responsive to a policy control create request message.

16. A second network node implementing a second network function, the second network node comprising:

at least one processor; and at least one memory, the at least one memory containing instructions executable by the at least one processor, wherein the second network node is operative to perform a process comprising:

sending to a first network function a message comprising a set of one or more rules, the set of one or more rules comprising one or more session rules and/or one or more policy and charging control (PCC) rules; and when a PDU session s determined to be terminated by the first network function based on a failure of an enforcement of the session rules and/or the PCC rules, receiving, from the first network function, a policy control delete message which comprises information indicating the PDU session is terminated due to session rule and/or PCC rule failure.

17. The second network node of claim 16, wherein the message to the first network function further comprises:

a policy control update notify request message;

a policy control update response message that is responsive to a policy control update request message from the first network function; or a policy control create response message that is responsive to a policy control create request message from the first network function.

* * * * *